United States Patent
Monk et al.

(10) Patent No.: US 6,501,809 B1
(45) Date of Patent: Dec. 31, 2002

(54) PRODUCING SMOOTHED CLOCK AND DATA SIGNALS FROM GAPPED CLOCK AND DATA SIGNALS

(75) Inventors: Anton Monk, San Diego, CA (US); Ladd S. El Wardani, La Jolla, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/272,760

(22) Filed: Mar. 19, 1999

(51) Int. Cl.[7] ................................................. H04L 7/00

(52) U.S. Cl. ........................ 375/363; 375/364; 375/372; 375/376; 370/504; 370/505; 327/160; 327/165

(58) Field of Search .................................. 375/354, 363, 375/364, 371, 372, 376, 222; 370/503, 504, 505, 528; 327/141, 160, 165, 175

(56) References Cited

U.S. PATENT DOCUMENTS

| | | | | |
|---|---|---|---|---|
| 4,596,026 A | * | 6/1986 | Cease et al. ................. | 370/505 |
| 5,119,406 A | * | 6/1992 | Kramer ....................... | 370/504 |
| 5,157,655 A | * | 10/1992 | Hamlin et al. .............. | 370/545 |
| 5,471,511 A | * | 11/1995 | De Langhe et al. ........ | 375/371 |

OTHER PUBLICATIONS

Data–Over–Cable–Service Interface Specifications, RF Interface Specification, SP–RFI v1.1–D01–981214, Cable Television Laboratories, Inc.

* cited by examiner

*Primary Examiner*—Stephen Chin
*Assistant Examiner*—Dac Vinh Ha
(74) *Attorney, Agent, or Firm*—Christopher J. Rourk; Akin, Gump, Strauss, Hauer & Feld, LLP

(57) ABSTRACT

A clock smoothing circuit generates a smoothed clock signal from a gapped clock signal having unevenly spaced pulses separated by gaps that result from the removal of data bits and from a reference clock signal having evenly spaced pulses that create a predetermined reference frequency. A smoothing element is coupled to the input elements to receive the gapped clock signal and the reference clock signal. In one embodiment, the smoothing element generates a smoothed clock signal having one pulse for each of the pulses in the gapped clock signal and having a frequency that is greater than one-half of the predetermined reference frequency. Each pulse in the smoothed clock signal is synchronized with a pulse in the reference clock signal. In another embodiment, the smoothing element includes an accumulator that counts the pulses of the reference clock signal, a modulo signal that resets the accumulator to a particular reset value when a predetermined number of pulses M is reached, and an output element that produces one pulse of the smoothed clock signal for each pulse of the reference clock signal on which the modulo element does not reset the accumulator.

31 Claims, 5 Drawing Sheets

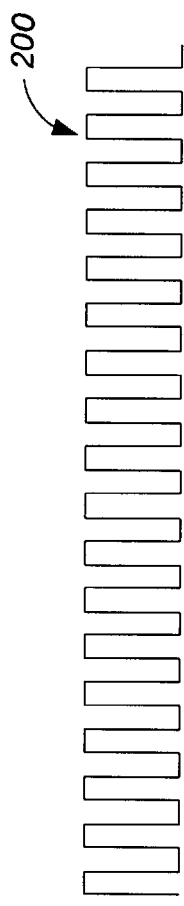
FIG. 2A  HIGH SPEED CLOCK
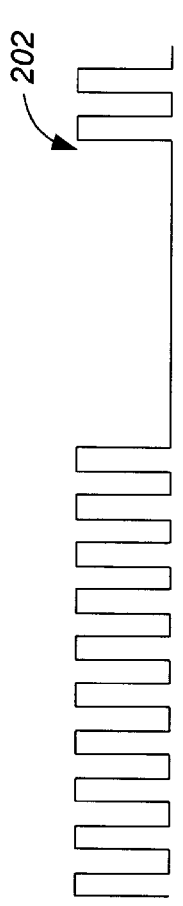
FIG. 2B  GAPPED CLOCK
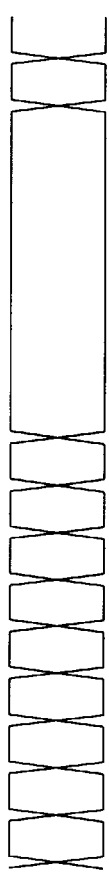
FIG. 2C  GAPPED DATA
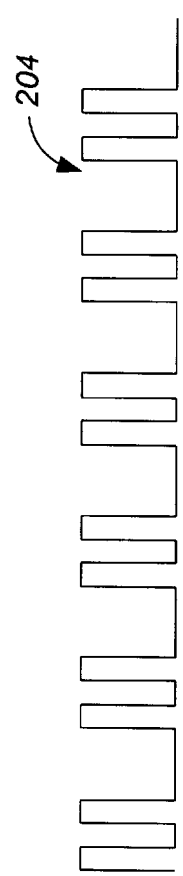
FIG. 2D  SMOOTHED CLOCK
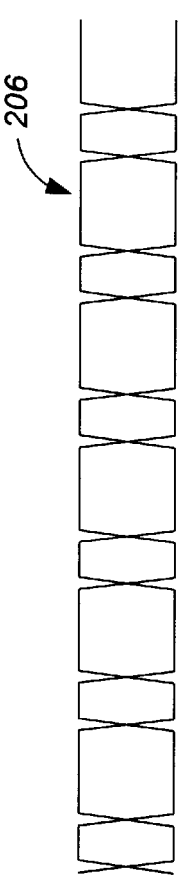
FIG. 2E  SMOOTHED DATA

PRODUCING SMOOTHED CLOCK AND DATA SIGNALS FROM GAPPED CLOCK AND DATA SIGNALS

TECHNICAL FIELD

The invention relates to producing smoothed clock and data signals from gapped clock and data signals.

BACKGROUND

In many modern communication systems, timing information, in the form of clock signals, plays a critical role in system performance. In these applications, the clock signals are used to drive circuitry such as mixers and sampling circuits for which consistency in the sampling instant is an important performance parameter. Minimizing timing errors requires minimizing the noise introduced during the distribution and buffering of clock signals in the system.

Some communication devices, such as cable modems, derive clock signals from timestamps embedded in data streams. In addition to timestamps, these data streams usually include error correction and synchronization information to ensure integrity and synchronization. In processing the data stream, the cable modem removes the error correction and synchronization bits, leaving a reference clock that is gapped or jittered where the error correction and other information were located. In general, these communication systems must smooth the reference clock for accurate data recovery.

Many systems use phase-locked loops (PLLs), or other similar circuits, to smooth the reference clock and the incoming data signal. A PLL uses a voltage-controlled oscillator (VCO) to produce an output frequency that is proportional to the voltage at the PLL output. As a result, PLLs require signal feedback and filtering. A PLL also requires careful attention to all sources of noise in the system and overall interaction of system components to minimize timing errors. Therefore, attaining high performance levels with PLLs may contribute considerable expense and complexity to the systems in which PLLs are used.

Direct digital synthesizers (DDSs) also are used to produce clock signals by accumulating phase changes at one clock frequency to generate highly accurate waveforms at a lower frequency. The DDS allows high resolution frequency and phase control, producing frequency steps on the order of mHz and phase increments on the order of nHz. To produce a particular frequency, an associated phase increment value is loaded into an input frequency register. The generated frequency and the DDS reference frequency are related to the phase increment value by the following equation:

$$F_{gen} = N/2^k \cdot F_{ref}$$

k=number of bits in phase accumulator

N=phase increment value

A desired frequency is generated by programming the phase change within the bit resolution of the phase accumulator. However, a conventional k-bit DDS has a resolution limited by the number of bits, k. Furthermore, sampling theory limits the generated frequency to no more than one-half the frequency of the incoming reference clock (the Nyquist rate).

SUMMARY

The inventors have developed a clock and data smoothing technique that allows generation of a clock of virtually any frequency up to the frequency of a reference clock. This technique is capable of generating exact frequencies and thus does not require approximations that normally involve the monitoring of feedback. Elimination of feedback obviates the need for a PLL circuit in many cases. This, in turn, allows the use of lower cost materials and fewer gate elements than are required for standard DDS clocks. This clock and data smoothing technique provides fully deterministic and pre-calculated phase errors of a given ratio N/M.

In addition, this technique produces a smooth clock up to the reference frequency, with a timing jitter less than the period of the reference clock. This technique also eliminates the need to maintain jitter statistics, acquisition times, and bandwidth for statistical performance analysis.

In one aspect, the invention involves the generation of a smoothed clock signal from a gapped clock signal having unevenly spaced pulses separated by gaps that result from the removal of data bits and from a reference clock signal having evenly spaced pulses that create a predetermined reference frequency. The smoothed clock signal includes one pulse for each of the pulses in the gapped clock signal and has a frequency that is greater than one-half of the predetermined reference frequency. Each pulse in the smoothed clock signal is synchronized with a pulse in the reference clock signal.

In some embodiments, the smoothed clock signal has a frequency equal to (M−N)/M of the predetermined reference frequency, where M represents the total number of pulses of the reference clock signal during a period of predetermined length, and where N equals the total number of these pulses that coincide with the gaps in the gapped clock signal. In other embodiments, an accumulator counts the pulses of the reference clock signal, and a modulo element resets the accumulator to a particular reset value when a predetermined number of pulses is reached. An output element produces one pulse of the smoothed clock signal for each pulse of the reference clock signal on which the modulo element does not reset the accumulator.

In another aspect of the invention, the smoothed clock signal is generated from the gapped clock signal and the reference clock signal by using an accumulator to count the pulses of the reference clock signal and by resetting the accumulator to a particular reset value when a predetermined number of pulses M is reached. One pulse of the smoothed clock signal is produced for each pulse of the reference clock signal on which the accumulator is not reset.

In some embodiments, the particular reset value equals a number of counted pulses minus the predetermined number. In other embodiments, resetting the accumulator involves comparing a number of counted pulses to the predetermined number N and asserting a modulo signal when the number of counted pulses reaches the predetermined number M. An output element produces a pulse of the smoothed clock signal at each pulse of the reference clock signal when enabled. The output element is disabled when the modulo signal is asserted. In other embodiments, the accumulator increments by a predetermined number N at each pulse of the reference clock signal, such that N/M equals a proportion of the gapped clock signal that is consumed by the gaps.

In another aspect, the invention features a system for use in removing jitter from a signal having gaps that result from the removal of error correction and synchronization information. The system includes a reference signal having a plurality of periodic pulses and a counting mechanism configured to count the periodic pulses in the reference signal by incrementing a count value by a first predetermined number. A reset mechanism resets the count value to a particular reset value when the count reaches a second predetermined number such that the ratio of the second predetermined number to the first predetermined number represents the ratio of the total amount of information in the input signal before removal of the error correction and synchronization information to the amount of error correction and synchronization information removed from the input signal. A pulse generating mechanism generates an output signal pulse on each pulse of the reference signal for which the count value has not reached the second predetermined number and leaves a gap in the output signal on pulses for which the reset mechanism resets the count value, where each pulse of the output signal is synchronized with one of the pulses of the reference signal.

DESCRIPTION OF THE DRAWINGS

FIGS. 2A, 2B, 2C, 2D, and 2E are timing diagrams of a high speed clock signal, a gapped clock signal, a gapped data signal, a smoothed clock signal, and a smoothed data signal.

Like reference numbers and designations in the various drawings indicate like elements.

DETAILED DESCRIPTION

Figure 1:
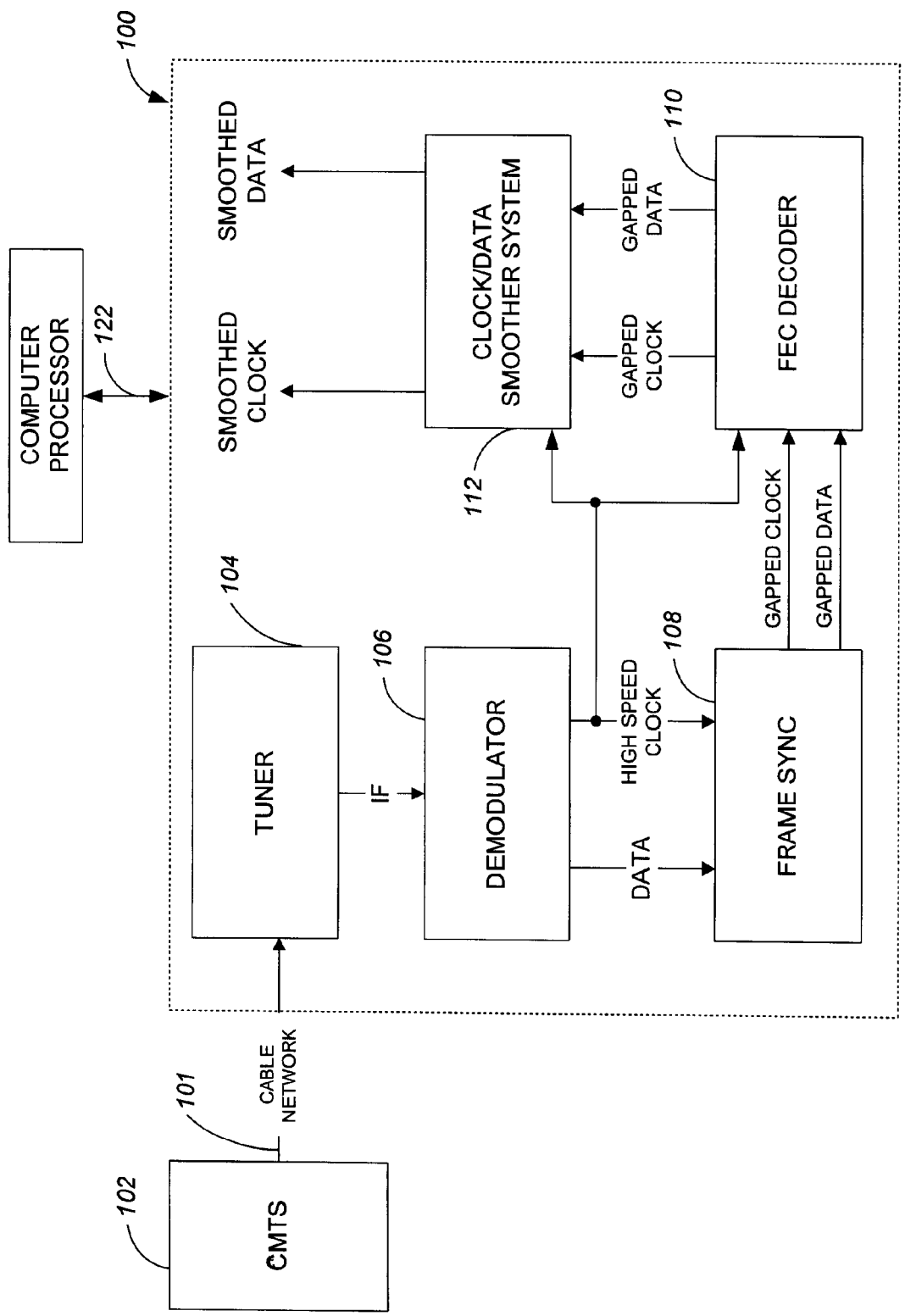
FIG. 1 is a block diagram of a communication system, such as a cable modem, having a clock and data smoother.

FIG. 1 shows a communication device, such as a cable modem 100, that performs a clock and data smoothing function. The cable modem 100 receives streamed data over a transmission system, such as a cable network 101, from a headend or service provider commonly known as a Cable Modem Termination System (CMTS) 102. Data transmission over the cable network 101 is governed by the Data-Over-Cable Service Interface Specifications, Radio Frequency (RF) Interface Specification, SP-RFIv1.1-D01-98214, published by Cable Television Laboratories, Inc. According to this specification, the CMTS 102 outputs an RF modulated signal using at least two different modulation types, such as 64-QAM and 256-QAM.

The CMTS 102 transmits an RF signal containing a data stream with embedded timestamps. The RF Interface Specification requires a 32-bit timestamp which counts up with a 10.24 MHZ master reference clock in the CMTS. Clock jitter is introduced into the timestamp when error correction and other information are removed from the data stream for accurate data recovery. The clock jitter is a particular measure of the error between a local clock generated from the timestamp and the master clock from which the CMTS 102 generated the timestamp.

The cable modem 100 includes a tuner 104 that down-converts the received RF signal to an intermediate frequency (IF). A demodulator 106 demodulates the IF signal into baseband symbols and converts the symbols into digital data for processing.

A frame sync circuit 108 receives the data from the demodulator 106 and processes the data to synchronize data contained in a frame. The frame sync circuit 108 produces a gapped clock signal due to removal of sync bits and delivers this signal to a Forward Error Correction (FEC) decoder 110 along with the synchronized data. The FEC decoder 110 performs error correction by removing parity bits using decoding techniques based on Trellis and Reed-Solomon algorithms. Removal of the error correction and sync information leaves gaps in the clock and data signals that exit the FEC decoder 110. A clock and data smoother 112 receives the gapped clock and data signals and produces a smoothed clock signal and a smoothed data signal. The smoothed clock and data signals are delivered to a computer processor or other data processing device 120 through a data-over-cable interface component 122.

FIGS. 2A through 2E show timing diagrams of the high speed clock signal 200, the gapped clock signal 202, the gapped data signal 203, the smoothed clock signal 204, and the smoothed data signal 206. The clock and data smoother 112 uses the high speed clock signal 200 to smooth the gapped clock and data signals 202, 204, operating under the principle that the amount of FEC and sync overhead in a data stream relative to the total amount of data can be expressed as a ratio of two integers, N/M.

The integer N represents a symbol increment value that is used to increment a reference clock frequency (i.e., the high speed clock frequency) accumulator. The reference clock frequency accumulator increments by N when the reference clock pulse triggers the accumulator. The accumulator continues to accumulate the reference clock pulse until the accumulated value reaches the integer M. The ratio of the two integers, N/M, determines the frequency of the smoothed clock signal 204 relative to the frequency of the reference clock. The smoothed clock signal 204 has the same number of pulses as the gapped clock signal 202. In general, the ratio N/M is selected to equal the ratio between the amount of error correction and synchronization information removed from a data stream in producing the gapped clock signal 202 and the total amount of information in the data stream. This type of clock is known as a "modulo M" DDS, because when the accumulated value reaches some integer M, a modulo M number is left in the accumulator by subtracting the integer M from the accumulated value.

When a smoothed clock frequency greater than one-half of the reference frequency is desired, a "reverse modulo M" DDS is used. The reverse modulo M DDS has an output frequency that is [1−(N/M)], or [(M−N)/M], times the reference frequency. The reverse modulo M DDS generates a smoothed clock signal 204 like that shown in FIG. 2 when default values of N=1 and M=3 are used for 64-QAM. Thus, a reverse modulo M clock with inputs N=1 and M=3 generates an output frequency for the smoothed clock signal that is ⅔ of the reference frequency.

The smoothing circuit 112 first smooths the gapped clock signal 202 to produce the smoothed clock signal 204 by using an accumulator to accumulate the high speed clock pulses. The accumulator increments by N at each pulse of the high speed clock until the accumulated value reaches the modulo integer M, at which point the accumulator resets to an initial value. The smoothed clock signal 204 is produced by outputting each high speed clock pulse for which the accumulator value does not equal the modulo integer M and by outputting no pulse for the clocking period during which the accumulator is reset. The smoothed data signal 206 is produced by using the gapped clock signal 202 to clock the gapped data signal 203 into a buffer and then using the smoothed clock signal 204 to clock the buffered data out of the buffer.

Figure 3:
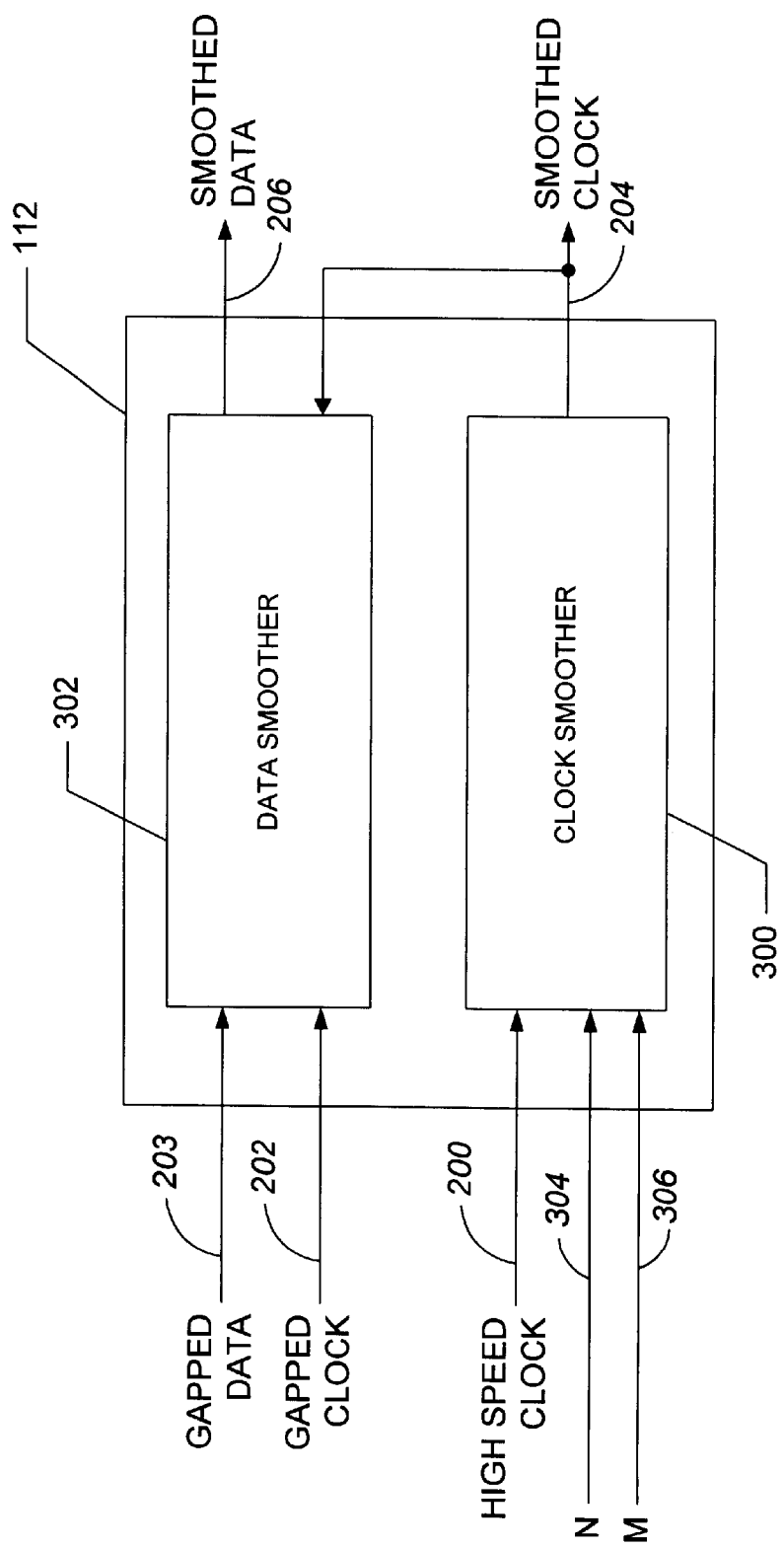
FIG. 3 is a block diagram of a clock and data smoother system.

FIG. 3 shows the clock and data smoothing circuit 112 in more detail. The circuit includes a clock smoother 300 and a data smoother 302 which produce the smoothed clock signal 204 and the smoothed data signal 206, respectively. The clock smoother 300 receives the high speed clock signal 200 from the demodulator, along with two input signals 304, 306, representing selected values for the integers N and M. The data smoother 302 receives the gapped clock signal 202 and the gapped data signal 203 from the FEC decoder, as well as the smoothed clock signal 204 from the clock smoother 300.

A conventional DDS has a resolution limited by the number of bits k. However, the clock and data smoother 112 shown here, in generating the smoothed clock signal 204, produces a clock frequency at any desired ratio N/M or M−N/M of the reference clock frequency. Also, the modulo M DDS and the reverse modulo M DDS produced by the clock and data smoother 112 is fully deterministic without any feedback.

Figure 4:
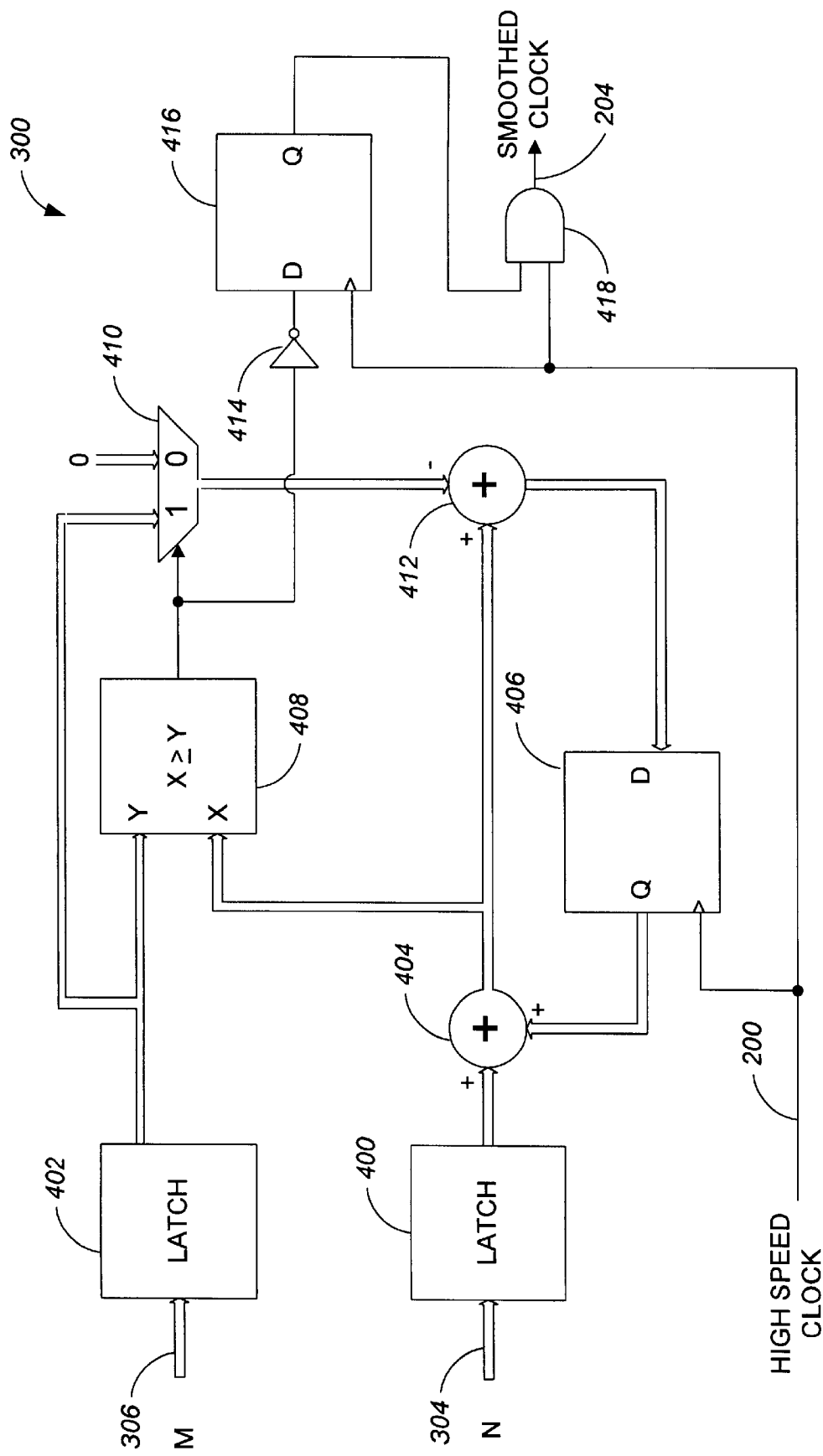
FIG. 4 is a schematic diagram of a clock smoother.

FIG. 4 shows one implementation of the clock smoother 300. The clock smoother 300 includes two input latches 400, 402 that receive two input signals 304, 306 representing the integers N and M. A summing circuit 404 receives the latched N-value and combines it with the outputs of a latching circuit 406, such as one or more D-type flip-flops. The number of flip-flops in the latching circuit depends on the number of bits in each data bus. In general, the latching circuit includes one flip-flop for each bit in the data bus. Initially, the latching circuit 406 is reset and outputs zero values. The latching circuit is clocked by the high speed clock signal 200 and receives as input a signal that is discussed below.

The output of the summing circuit 404 is provided to a comparator 408, along with the latched M-value. The comparator 408 outputs a high logic value if the output signal from the summing circuit 404 is greater than or equal to the latched M-value. Otherwise, the comparator 408 outputs a logic zero.

The output of the comparator 408 is provided to a selector circuit 410 that selects either the latched M-value or a constant zero value. The selector circuit 410 selects the latched M-value if the comparator 408 outputs a logic high value and selects the constant zero value if the comparator 408 outputs a logic low value. The selector circuit 410 functions as a modulo indicator by outputting the modulo integer M when the output of the summing circuit 404 reaches this value M.

An adder element 412 receives the outputs of the summing circuit 404 and the selector circuit 410 and subtracts the latter, which is either a zero or the M-value, from the former. The output of the adder 412 is provided as input to the latching circuit 406. The latching circuit 406 passes the previous value of the summing circuit output if the value has not yet reached the modulo integer M. When the output of the summing circuit 404 reaches the modulo value M, the adder 412 produces a zero value, which the latching circuit 406 passes to the summing circuit 404.

The output of the comparator 408 also is provided to an inverter circuit 414, the output of which is provided to an output latch 416, such as a D-type flip-flop. The output latch 416 enables an AND gate 418 that receives the high speed clock 200 as input. In combination, the inverter 414, the output latch 416, and the AND gate 418 generate a serialized and smoothed clock signal that is triggered by the rising edge of the high speed clock 200, even while the output of the summing circuit 404 continues to increment because it has not reached the modulo value M. When the summing circuit output 404 reaches the modulo value (M), the inverter 414, the output latch 416, and the AND gate 418 disable the generation of the smoothed clock output during the next period of the high speed clock. Because the latching circuit 406 is triggered by the rising edge of the high speed clock 200, the rising edges of the smoothed clock signal 204 are synchronized with rising edges of the high speed clock 200.

As an example, providing the values N=1 and M=3 to the clock smoother 300 of FIG. 4 produces a smoothed clock signal 204 at a frequency that is two-thirds of the high speed clock frequency. The summing circuit 404 is incremented by one (N=1) at each pulse of the high speed clock. When the output of the summing circuit is one or two, the comparator 408 outputs a logic low and the inverter 414 outputs a logic high. As a result, the AND gate 418 outputs one pulse of the smoothed clock signal 204 for each of the corresponding high speed clock pulses. When the summing circuit output reaches the modulo value three, the comparator 408 outputs a logic high, the inverter outputs a logic low, and the AND gate 418 does not output a high speed clock pulse for this clock period. The summing circuit 404 also is reset to a value of one, and the process repeats. As a result, in this example, the smoothed clock signal 204 includes two pulses for every three pulses of the high speed clock and thus has a frequency that is two-thirds the frequency of the high speed clock.

Figure 5:
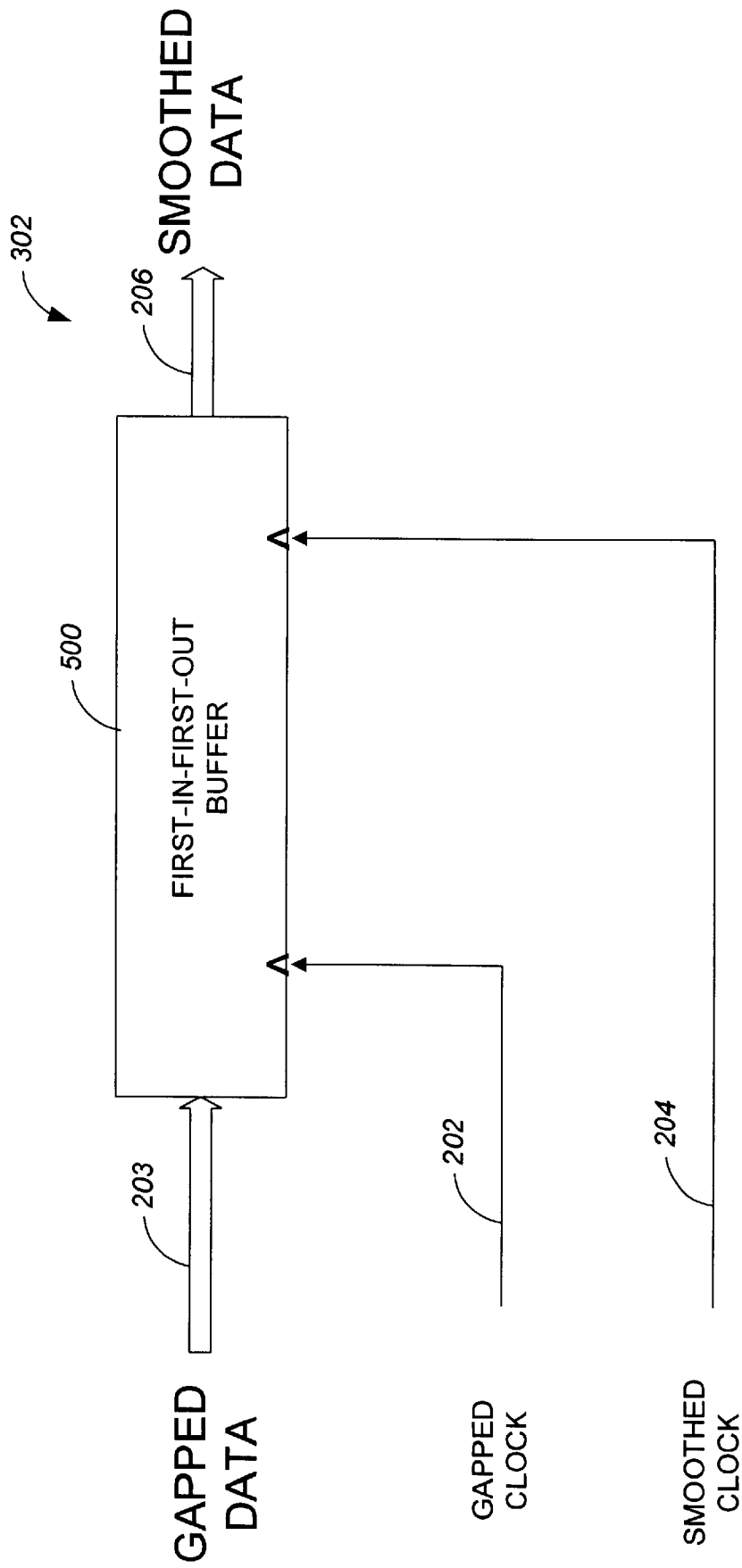
FIG. 5 is a block diagram of a data smoother.

FIG. 5 shows one implementation of the data smoother 302. The data smoother 302 includes a first-in-first-out (FIFO) buffer 500 that receives and stores the gapped data signal 203. The gapped clock signal 202 clocks the gapped data into the FIFO buffer 500. The FIFO buffer 500 holds the gapped data until the smoothed clock signal 204 clocks the data out of the FIFO buffer 500. The output of the FIFO buffer 500 is a smoothed data stream that forms the smoothed data signal 206, which is synchronized with the smoothed clock signal 204.

A number of embodiments of the present invention have been described. Nevertheless, it will be understood that various modifications may be made without departing from the spirit 10 and scope of the invention. For example, some versions of the clock smoother described above are implemented as standard modulo M DDS instead of reverse modulo M DDS. One way of doing so is by eliminating the inverter 414 and passing the output of the comparator 408 directly to the output latch 416. Also, the integer values N and M will vary among applications, usually depending upon the ratio of the parity and overhead bytes to the high speed clock rate. Moreover, while this clock and data smoothing technique has been described in terms of gapped signals produced by frame sync and FEC decoder circuits in a cable modem, the smoother is useful in other applications as well, such as set top boxes for Direct or Cable television service. Alternative embodiments of the clock and data smoother are carried out in discrete digital components, in application specific integrated circuits (ASICs), in computer programs executed by programmable processors, or in some combination of these technologies. Accordingly, other embodiments are within the scope of the following claims.

What is claimed is:

1. A clock smoothing circuit for use in generating a smoothed clock signal, the circuit comprising:
   (a) an input element that receives a gapped clock signal having unevenly spaced pulses separated by gaps that result from the removal of data bits;
   (b) another input element that receives a reference clock signal having evenly spaced pulses that create a predetermined reference frequency; and
   (c) a smoothing element coupled to the input elements to receive the gapped clock signal and the reference clock signal and configured to generate a smoothed clock signal having one pulse for each of the pulses in the gapped clock signal and having a frequency that is greater than one-half of the predetermined reference frequency, where each pulse in the smoothed clock signal is synchronized with a pulse in the reference clock signal.

2. The circuit of claim 1, wherein the smoothed clock signal has a frequency equal to (M–N)/M of the predetermined reference frequency, where M represents the total number of pulses of the reference clock signal during a period of predetermined length, and where N equals the total number of these pulses that coincide with the gaps in the gapped clock signal.

3. The circuit of claim 1, wherein the smoothing element includes an accumulator configured to count the pulses of the reference clock signal and a modulo element configured to reset the accumulator to a particular reset value when a predetermined number of pulses is reached.

4. The circuit of claim 3, wherein the smoothing element includes an output element configured to produce one pulse of the smoothed clock signal for each pulse of the reference clock signal on which the modulo element does not reset the accumulator.

5. A clock smoothing circuit for use in generating a smoothed clock signal, the circuit comprising:
   (a) an input element that receives a gapped clock signal having unevenly spaced pulses separated by gaps that result from the removal of data bits;
   (b) another input element that receives a reference clock signal having evenly spaced pulses; and
   (c) a smoothing element coupled to the input elements to receive the gapped clock signal and the reference clock signal, the smoothing element comprising:
      (1) an accumulator configured to count the pulses of the reference clock signal;
      (2) a modulo element configured to reset the accumulator to a particular reset value when a predetermined number of pulses M is reached; and
      (3) an output element configured to produce one pulse of the smoothed clock signal for each pulse of the reference clock signal on which the modulo element does not reset the accumulator.

6. The circuit of claim 5, wherein the particular reset value equals a number of counted pulses minus the predetermined number.

7. The circuit of claim 5, wherein the modulo element includes a comparator configured to compare a number of counted pulses to the predetermined number M and to assert a modulo signal when the number of counted pulses reaches the predetermined number M.

8. The circuit of claim 7, wherein the output element is configured to:
   (a) produce a pulse of the smoothed clock signal at each pulse of the reference clock signal when enabled; and
   (b) become disabled when the modulo signal is asserted.

9. The circuit of claim 7, wherein the accumulator is configured to increment by a predetermined number N at each pulse of the reference clock signal, such that N/M equals a proportion of the gapped clock signal that is consumed by the gaps.

10. A system for use in removing jitter from a signal having gaps that result from the removal of error correction and synchronization information, the system comprising:
   (a) a reference signal having a plurality of periodic pulses;
   (b) a counting mechanism configured to count the periodic pulses in the reference signal by incrementing a count value by a first predetermined number;
   (c) a reset mechanism configured to reset the count value to a particular reset value when the count reaches a second predetermined number, such that the ratio of the second predetermined number to the first predetermined number represents the ratio of the total amount of information in the input signal before removal of the error correction and synchronization information to the amount of error correction and synchronization information removed from the input signal; and
   (d) a pulse generating mechanism configured to generate an output signal pulse on each pulse of the reference signal for which the count value has not reached the second predetermined number and to leave a gap in the output signal on pulses for which the reset mechanism resets the count value, where each pulse of the output signal is synchronized with one of the pulses of the reference signal.

11. The system of claim 10, wherein the particular reset value equals the count value minus the second predetermined number.

12. The system of claim 10, wherein the counting mechanism includes an adding circuit configured to sum the first predetermined number with the count value.

13. The system of claim 12, wherein the reset mechanism includes:
   (a) a comparator circuit configured to compare the second predetermined number with the count value and to assert a logic value at an output line when the count value is at least equal to the second predetermined number; and
   (b) a differencing circuit configured to subtract the second predetermined number from the count value when the comparator circuit asserts the logic value on the output line.

14. The system of claim 13, wherein the differencing circuit includes:
   (a) a multiplexer configured to select either the second predetermined number or a zero value in response to the assertion or de-assertion of the output line; and
   (b) an adder configured to subtract the second predetermined number or zero value from the count value.

15. The system of claim 13, wherein the pulse generating mechanism includes a latching circuit configured to latch the logic value on the output line and to use the latched logic value to generate the output signal.

16. The system of claim 15, wherein the latching circuit includes:
   (a) a data latch coupled to the output line and triggered by the reference signal; and
   (b) an AND gate coupled to the latch and enabled by the reference signal.

17. The system of claim 16, wherein the latching circuit also includes an inverter between the comparator and the data latch to invert the logic value on the output line of the comparator.

18. The system of claim 10, further comprising a buffer circuit that receives signals containing the first and the second predetermined numbers.

19. The system of claim 10, further comprising a data synchronizing circuit configured to receive a stream of data synchronized to the jittered input signal, and output a stream of data synchronized to the output signal.

20. The system of claim 19, wherein the data synchronizing circuit includes a buffer circuit into which the stream of data is clocked by the input signal and out of which the data stream is clocked by the output signal.

21. The system of claim 20, wherein the buffer circuit includes a first-in-first-out buffer.

22. A method for use in generating a smoothed clock signal, the method comprising:
   (a) receiving a gapped clock signal having unevenly spaced pulses separated by gaps that result from the removal of data bits;
   (b) receiving a reference clock signal having evenly spaced pulses that create a predetermined reference frequency; and
   (c) generating a smoothed clock signal having one pulse for each of the pulses in the gapped clock signal and having a frequency that is greater than one-half of the predetermined reference frequency, where each pulse in the smoothed clock signal is synchronized with a pulse in the reference clock signal.

23. The method of claim 22, wherein the smoothed clock signal has a frequency equal to (M−N)/M of the predetermined reference frequency, where M represents the total number of pulses of the reference clock signal during a period of predetermined length, and where N equals the total number of these pulses that coincide with the gaps in the gapped clock signal.

24. The method of claim 22, wherein generating the smoothed clock signal includes:
   (a) counting the pulses of the reference clock signal in an accumulator; and
   (b) resetting the accumulator to a particular reset value when a predetermined number of pulses is reached.

25. The method of claim 24, wherein generating the smoothed clock signal also includes producing one pulse of the smoothed clock signal for each pulse of the reference clock signal when the accumulator is not reset.

26. A method for use in generating a smoothed clock signal, the method comprising:
   (a) receiving a gapped clock signal having unevenly spaced pulses separated by gaps that result from the removal of data bits;
   (b) receiving a reference clock signal having evenly spaced pulses;
   (c) counting the pulses of the reference clock signal;
   (d) resetting the count to a particular reset value when a predetermined number of pulses M is reached; and
   (e) producing one pulse of the smoothed clock signal for each pulse of the reference clock on which the pulse count is not reset.

27. The method of claim 26, wherein the particular reset value equals a number of counted pulses minus the predetermined number.

28. The method of claim 26, wherein resetting the pulse count includes comparing a number of counted pulses to the predetermined number M and asserting a modulo signal when the number of count pulses reaches the predetermined number M.

29. The method of claim 28, wherein counting the pulses of the reference clock signal includes incrementing a count by a predetermined number N at each pulse of the reference clock signal, such that N/M equals a proportion of the gapped clock signal that is consumed by the gaps.

30. A computer system comprising:
   (a) a data-over-cable interface component; and
   (b) a cable modem comprising:
      (1) a gapped clock signal having unevenly spaced pulses separated by gaps that result from the removal of data bits and a reference clock signal having evenly spaced pulses that create a predetermined reference frequency; and
      (2) a smoothing circuit configured to generate a smoothed clock signal having one pulse for each of the pulses in the gapped clock signal and having a frequency that is greater than one-half of the predetermined reference frequency, where each pulse in the smoothed clock signal is synchronized with a pulse in the reference clock signal.

31. A computer system comprising:
   (a) a data-over-cable interface component; and
   (b) a cable modem comprising:
      (1) data reception circuitry configured to receive a stream of data and produce a gapped clock signal having unevenly spaced pulses separated by gaps that result from the removal of data bits and a reference clock signal having evenly spaced pulses that create a predetermined reference frequency; and
      (2) a smoothing circuit coupled to the data reception circuitry to receive the gapped clock signal and the reference clock signal, the smoothing circuit comprising:
         a. an accumulator configured to count the pulses of the reference clock signal;
         b. a modulo element configured to reset the accumulator to a particular reset value when a predetermined number of pulses M is reached; and
         c. an output element configured to produce one pulse of the smoothed clock signal for each pulse of the reference clock signal on which the modulo element does not reset the accumulator.

* * * * *